(12) United States Patent
Lu et al.

(10) Patent No.: US 11,676,427 B2
(45) Date of Patent: Jun. 13, 2023

(54) VEHICLE COMPONENT MODIFICATION BASED ON VEHICLE-TO-EVERYTHING COMMUNICATIONS

(71) Applicant: TOYOTA JIDOSHA KABUSHIKI KAISHA, Toyota (JP)

(72) Inventors: Hongsheng Lu, Mountain View, CA (US); John Kenney, Mountain View, CA (US); Takayuki Shimizu, Mountain View, CA (US)

( * ) Notice: Subject to any disclaimer, the term of this patent is extended or adjusted under 35 U.S.C. 154(b) by 482 days.

(21) Appl. No.: 16/273,435

(22) Filed: Feb. 12, 2019

(65) Prior Publication Data

US 2020/0258320 A1 Aug. 13, 2020

(51) Int. Cl.
| | | |
|---|---|---|
| G07C 5/00 | (2006.01) | |
| G05D 1/00 | (2006.01) | |
| H04W 4/40 | (2018.01) | |
| H04B 17/318 | (2015.01) | |

(52) U.S. Cl.
CPC ........... *G07C 5/008* (2013.01); *G05D 1/0022* (2013.01); *G05D 1/0088* (2013.01); *H04B 17/318* (2015.01); *H04W 4/40* (2018.02)

(58) Field of Classification Search
CPC ....... G07C 5/008; H04B 17/318; H04W 4/40; G05D 1/0022; G05D 1/008
See application file for complete search history.

(56) References Cited

U.S. PATENT DOCUMENTS

2013/0158862 A1* 6/2013 Stahlin ................. G08G 1/162 455/39
2016/0370469 A1* 12/2016 Mabuchi .............. G07B 15/063
2017/0149820 A1* 5/2017 Ruvio ................... B60R 16/023
2018/0097637 A1* 4/2018 Weinfield ................ H04W 4/12
2018/0272993 A1* 9/2018 Johnson ................... H04K 3/65
2019/0041223 A1* 2/2019 Yang .................... H04W 12/122
(Continued)

FOREIGN PATENT DOCUMENTS

WO WO-2018064179 A1 * 4/2018

OTHER PUBLICATIONS

Connected Vehicles (Radovan Miucic, ed., Connected Vehicles, Oct. 25, 2018) (Year: 2018).*

*Primary Examiner* — Maceeh Anwari
*Assistant Examiner* — Charles Pall
(74) *Attorney, Agent, or Firm* — Burbage Law, P.C.; Jon-Michael Burbage

(57) ABSTRACT

The disclosure describes embodiments for modifying a vehicle component of an ego vehicle based on ranging and misbehavior information determined from digital data included in a Vehicle-to-Everything (V2X) message. In some embodiments, a method includes generating Received Signal Strength (RSS) data describing an RSS value for the V2X message which is originated by a remote vehicle. The method includes determining range data corresponding to the RSS value describing a first range from the ego vehicle to the remote vehicle. The method includes determining that the remote vehicle is providing inaccurate sensor data (an example of misbehavior information) by comparing the first range to a second range which is described by the sensor data that is extracted from the V2X message. The method includes modifying an operation of the vehicle component so that the vehicle component does not consider the sensor data that is provided by the remote vehicle.

20 Claims, 9 Drawing Sheets

(56) References Cited

U.S. PATENT DOCUMENTS

| | | | |
|---|---|---|---|
| 2019/0068582 A1* | 2/2019 | Kim | H04W 12/122 |
| 2019/0191311 A1* | 6/2019 | O'Brien | H04W 12/122 |
| 2019/0243002 A1* | 8/2019 | Song | B60Q 9/00 |
| 2019/0268371 A1* | 8/2019 | High | H04W 4/025 |
| 2019/0349802 A1* | 11/2019 | Weinfield | H04W 4/021 |

* cited by examiner

BSM DATA 195

- Vehicles and other client devices equipped with Dedicated Short Range Communication ("DSRC") transmit a Basic Safety Message ("BSM") at a regular interval.

- Each BSM includes the following BSM data describing one or more of the following types of sensor data 185 for the remote vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 4

BSM DATA 195

Part 1

GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2

Vehicle Path History
Future Vehicle Path Estimation
Hard Active Braking
Traction Control System active over 100 milliseconds?
Antilock Brake System active over 100 milliseconds?
Light Status
Wiper Status
Vehicle type
A unique identifier of the vehicle (e.g., a VIN number)

Figure 5

First Use Case

- Scenario: A misbehaving device (e.g., a misbehaving vehicle) may deliberately provide sensor data that indicates that there is a stopped vehicle in front of an ego vehicle, causing an alert in the ego vehicle. For example, the ADAS systems or autonomous driving systems of the ego vehicle may suddenly brake or swerve to avoid a collision. *However, in reality there is not a stopped vehicle in front of the ego vehicle.*

- Example Solution Provided by the Modification System: By analyzing the RSS of BSMs received from the "stopped vehicle," the modification system of the ego vehicle estimates a range that describes roughly how far the "stopped vehicle" is from the ego vehicle. If the distance by analyzing the RSS suggests the range is not decreasing over time, the modification system determines that the misbehaving device has provided false sensor data because if there were a stopped vehicle in front of the ego vehicle, the RSS from the stopped vehicle will reflect a decreasing distance over time.

Figure 6

Second Use Case

- Scenario: Congestion control for BSM transmissions relies on counting the number of vehicles nearby. A misbehaving device could pretend to be 20 DSRC users and cause a congestion control algorithm to reduce message rate (to avoid channel congestion) too early. Reducing message rate when such a reduction should not occur harms the communication performance of DSRC.

- Example Solution Provided by the Modification System: A malicious device needs to compute 20 different locations to represent 20 fake vehicles. However, when analyzing the RSS of these transmissions, the modification system of the ego vehicle will realize that these transmissions suggest a transmitter from the same distance, rather than 20 different distances. Then the modification system of the ego vehicle determines that the malicious device is providing false sensor data.

Figure 7

VEHICLE COMPONENT MODIFICATION BASED ON VEHICLE-TO-EVERYTHING COMMUNICATIONS

BACKGROUND

The specification relates to vehicle component modification based on Vehicle-to-Everything (V2X) communications. In particular, this specification relates to modifying a vehicle component based on ranging and misbehavior information determined from digital data included in a V2X communication.

In the future, many vehicles will broadcast V2X communications that include digital data that describes their operating environment. For example, in the future all new vehicles will transmit Basic Safety Messages ("BSM" if singular or "BSMs" if plural) at a regular interval (e.g., once every 0.10 seconds). These BSMs are a type of V2X communication that include BSM data as their payload. The BSM data includes, among other things, sensor data that describes the environment of the vehicle that transmits the BSM. Other "ego vehicles" receive these BSMs because they are broadcasted. These ego vehicles use the sensor data as an input to their Advanced Driver Assistance Systems (ADAS systems) or autonomous driving systems or V2X communication system; these ADAS systems or autonomous driving systems then rely on the accuracy of the sensor data and control the operation of the ego vehicle based on the information included in the sensor data. However, there is no guarantee that the sensor data is accurate. It is also possible that the sensor data has been alternated by a malicious party such as a hacker. This is problematic because the ADAS systems, the autonomous driving system and V2X communication system of the ego vehicle are safety critical components and their proper operation relies on the accuracy of the sensor data received from other vehicles.

SUMMARY

There are existing solutions that attempt to solve this problem. These existing solutions are inadequate because: (1) they do not identify a misbehaving endpoint that is repeatedly transmitting inaccurate sensor data via V2X communications; and (2) they do not take steps to modify the operation of an ego vehicle's ADAS systems or autonomous driving system so that the inaccurate sensor data transmitted by a misbehaving endpoint is ignored in the future by the ego vehicle so that the inaccurate sensor data does not create a safety hazard.

Described herein are embodiments of a modification system. The modification system beneficially solves the problems described above without the shortcomings of the existing solutions. Embodiments of the modification system are now described.

In some embodiments, the modification system is installed in an electronic control unit of an ego vehicle. The ego vehicle is a connected vehicle. In some embodiments, the ego vehicle is an autonomous vehicle. The ego vehicle receives V2X messages that include safety critical information that is used by the ego vehicle to control the operation of one or more components of the ego vehicle. For example, the ego vehicle receives a BSM from a remote vehicle that includes information describing or indicating an environment of the ego vehicle (i.e., sensor data), which an ADAS system or autonomous driving system or V2X communication system of the ego vehicle uses as an input when controlling the operation of the ego vehicle or the components of the ego vehicle (e.g., the braking system, the steering system, calculation of message rate etc.).

The remote vehicle transmits additional BSMs over time including new instances of sensor data; each received BSM has a Received Signal Strength (RSS) that is measurable by the modification system of the ego vehicle. The modification data generates RSS data that describes the RSS of each received BSM. The modification system of the ego vehicle analyzes the sensor data and the RSS data of each received BSM and determines, based on the RSS described by the RSS data, range data that describes an estimated range separating the ego vehicle from objects in the environment of the ego vehicle. The modification system compares the range data computed from different BSMs of the remote vehicle; based on this comparison, the modification system determines whether the remote vehicle is misbehaving by providing false information about the environment of the ego vehicle.

If misbehavior is detected by the modification system, the modification system modifies the operation of the ADAS systems or the autonomous driving system of the ego vehicle so that they ignore sensor data received in future BSMs transmitted by this particular remote vehicle (but not other remote vehicles). For example, the remote vehicle may report dramatically different locations in different BSMs, misleading the ego vehicle to think there are many different vehicles on the road. The modification system of the ego vehicle, via the range data computed from remote vehicle's BSMs, could detect the false information reported by the remote vehicle.

There is no existing solution that: (1) identifies, without using onboard sensors, a misbehaving endpoint that is repeatedly transmitting inaccurate (or possibly malicious) sensor data via V2X communications; and (2) takes remedial steps to modify the operation of an ego vehicle's ADAS systems or autonomous driving system so that the inaccurate sensor data transmitted by a misbehaving endpoint is ignored in the future by the ego vehicle so that the inaccurate sensor data does not create a safety hazard resulting from the operation of the ADAS systems, autonomous driving system or V2X communication system using inaccurate sensor data.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method executed by an ego vehicle, the method including: generating RSS data describing an RSS value for a V2X message originated by a remote vehicle; determining range data corresponding to the RSS value describing a first range from the ego vehicle to the remote vehicle; determining that the remote vehicle is providing inaccurate sensor data by comparing the first range to a second range which is described by the sensor data which is extracted from the V2X message; and modifying an operation of a vehicle component of the ego vehicle so that the vehicle component does not consider the sensor data that is provided by the remote vehicle. Other embodiments of this aspect include corresponding computer systems, apparatus, and computer programs recorded on one or more computer storage devices, each configured to perform the actions of the methods.

Implementations may include one or more of the following features. The method where the V2X message is a dedicated short-range communication message. The method where the V2X message is not one of the following: a WiFi message; a 3G message; a 4G message; a 5G message; a Long-Term Evolution (LTE) message; a millimeter wave communication message; a Bluetooth message; and a satellite communication. The method where the V2X message is received by a V2X radio. The method where the V2X radio is not an element of the ego vehicle. The method where the V2X radio includes a plurality of channels including a reserved channel that is reserved for receiving the V2X message. The method where the reserved channel is reserved for a BSM. The method where the vehicle component is selected from a group that includes: an advanced driver assistance system; an autonomous driving system; and a communication unit. Implementations of the described techniques may include hardware, a method or process, or computer software on a computer-accessible medium.

One general aspect includes a system including: a processor communicatively coupled to a V2X radio and a non-transitory memory, where the V2X radio is operable to receive a V2X message and the non-transitory memory stores computer code that is operable, when executed by the processor, to cause the processor to: generate RSS data describing an RSS value for a V2X message originated by a remote vehicle; determine range data corresponding to the RSS value describing a first range from an ego vehicle to the remote vehicle; determine that the remote vehicle is providing inaccurate sensor data by comparing the first range to a second range which is described by the sensor data which is extracted from the V2X message; and modify an operation of a vehicle component of the ego vehicle so that the vehicle component does not consider the sensor data that is provided by the remote vehicle. Other embodiments of this aspect include corresponding computer systems, apparatus, and computer programs recorded on one or more computer storage devices, each configured to perform the actions of the methods.

Implementations may include one or more of the following features. The system where the V2X message is a dedicated short-range communication message. The system where the V2X message is not one of the following: a WiFi message; a 3G message; a 4G message; a 5G message; an LTE message; a millimeter wave communication message; a Bluetooth message; and a satellite communication. The system where the V2X message is received by a V2X radio. The system where the V2X radio is not an element of the ego vehicle. The system where the V2X radio includes a plurality of channels including a reserved channel that is reserved for receiving the V2X message. The system where the reserved channel is reserved for a BSM. The system where the vehicle component is selected from a group that includes: an advanced driver assistance system; an autonomous driving system; and a communication unit. Implementations of the described techniques may include hardware, a method or process, or computer software on a computer-accessible medium.

One general aspect includes a computer program product including instructions that, when executed by a processor, causes the processor to perform operations including: generating RSS data describing an RSS value for a V2X message originated by a remote vehicle; determining range data corresponding to the RSS value describing a first range from an ego vehicle to the remote vehicle; determining that the remote vehicle is providing inaccurate sensor data by comparing the first range to a second range which is described by the sensor data which is extracted from the V2X message; and modifying an operation of a vehicle component of the ego vehicle so that the vehicle component does not consider the sensor data that is provided by the remote vehicle. Other embodiments of this aspect include corresponding computer systems, apparatus, and computer programs recorded on one or more computer storage devices, each configured to perform the actions of the methods.

Implementations may include one or more of the following features. The computer program product where modifying the operation of the vehicle component includes modifying the vehicle component so that the vehicle component does not consider the sensor data at a present time. The computer program product where modifying the operation of the vehicle component includes modifying the vehicle component so that the vehicle component does not consider future sensor data received from the remote vehicle. The computer program product where modifying the operation of the vehicle component includes modifying the vehicle component so that the vehicle component does not consider past sensor data received from the remote vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4 and 5 are block diagrams illustrating an example of BSM data according to some embodiments.

FIG. 6 is a block diagram illustrating a first use case for the modification system according to some embodiments.

FIG. 7 is a block diagram illustrating a second use case for the modification system according to some embodiments.

DETAILED DESCRIPTION

Figure 1A:
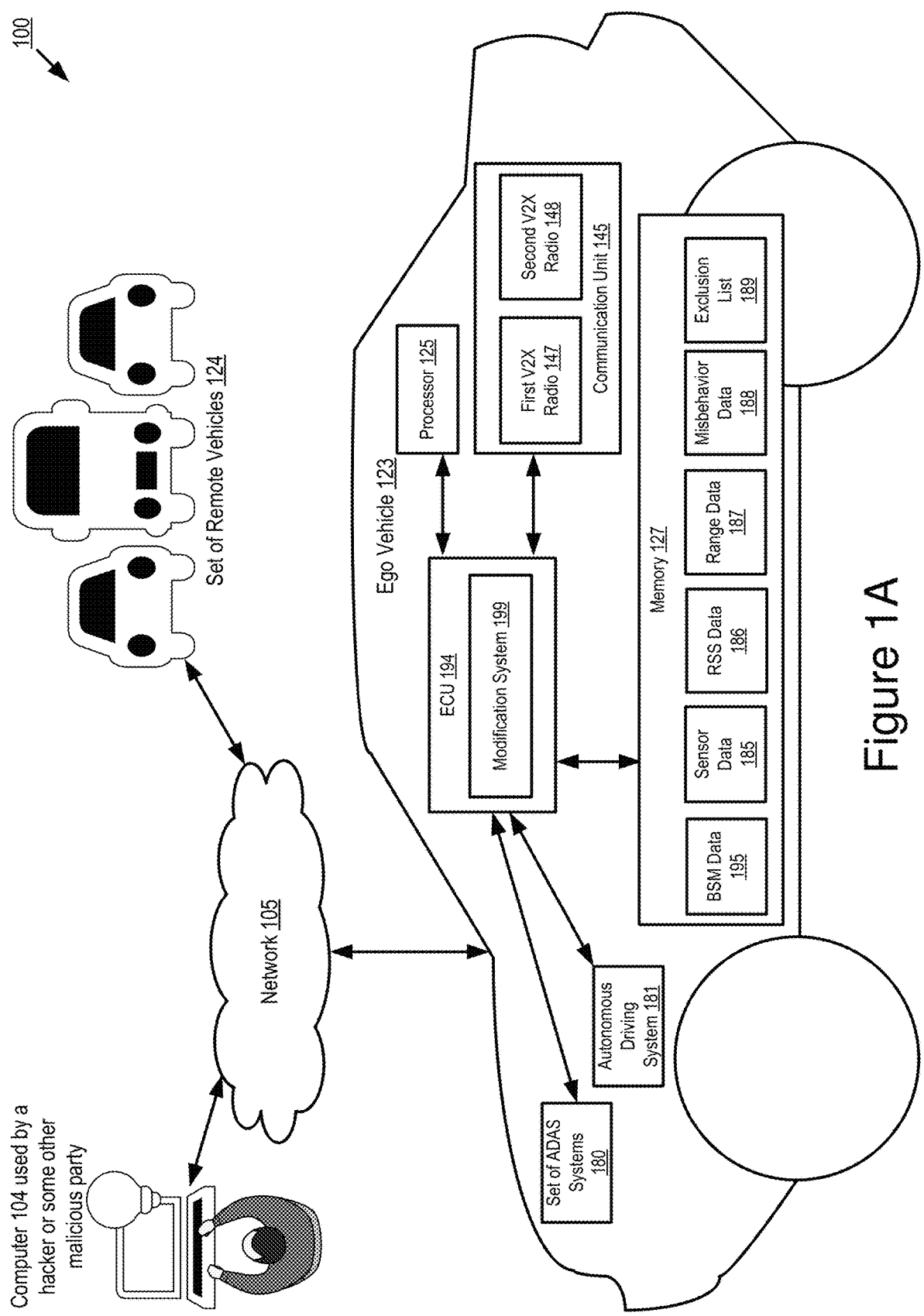
FIG. 1A is a block diagram illustrating an operating environment for a modification system according to some embodiments.

Embodiments of the modification system are now described. Although the modification system is described herein at times with reference to BSMs, the modification system will also work with any other type of V2X message and radio technologies (e.g., LTE-V2X, 5G-V2X, etc.).

The modification system is operable, when executed by a processor of a connected vehicle, to cause the processor to modify a vehicle component (or the operation of the vehicle component) based on ranging and misbehavior information determined from digital data included in a V2X communication Examples of V2X communication include one or more of the following: DSRC (including BSMs and PSMs, among other types of DSRC communication); LTE; millimeter wave communication; 3G; 4G; 5G; LTE-Vehicle-to-Everything (LTE-V2X); LTE-Vehicle-to-Vehicle (LTE-V2V); LTE-Device-to-Device (LTE-D2D); Voice over LTE (VoLTE); etc. In some embodiments, the V2X communication does not include one or more of the following: DSRC; 3G, 4G; 5G; LTE-V2X; LTE-V2V; LTE-D2D; and VoLTE.

In some embodiments, the connected vehicle that includes the modification system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. The DSRC-compliant GPS unit is described in more detail below A "DSRC-equipped" device is a processor-based device that includes a DSRC radio, a DSRC-compliant GPS unit and is operable to lawfully send and receive DSRC messages in a jurisdiction where the DSRC-equipped device is located. Various endpoints may be DSRC-equipped devices, including, for example, a roadside unit (RSU), a smartphone, a tablet computer and any other processor-based computing device that includes a DSRC radio and is operable to lawfully send and receive DSRC messages as described above.

In some embodiments, an RSU that is a DSRC-equipped device does not include a DSRC-compliant GPS unit, but does include a non-transitory memory that stores digital data describing positional information for the RSU having lane-level accuracy, and the DSRC radio or some other system of the RSU inserts a copy of this digital data in the BSM data that is transmitted by the DSRC radio of the RSU. In this way, the RSU does not include a DSRC-compliant GPS unit but is still operable to distribute BSM data that satisfies the requirements for the DSRC standard. The BSM data is described in more detail below with reference to FIGS. 4 and 5 according to some embodiments.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages. For example, FIGS. 4 and 5 depict examples of a permissible payload for a particular type of DSRC message referred to as a BSM. The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

In the United States, vehicles are equipped or will soon be equipped with V2X communication capability. These vehicles are referred to as V2X-equipped vehicles. V2X-equipped vehicles include: (1) onboard sensors that are operable to record data describing the path history and kinematic information about the vehicle (e.g., heading, speed, braking patterns such as hard braking, etc.); and (2) at least one V2X radio that is operable to transmit V2X messages, including BSMs which are transmitted at a user-configurable interval (the default interval is once every 0.10 seconds) and include BSM data that describes, among other things, sensor data that describes the environment of the vehicle that transmits the BSM.

Other "ego vehicles" receive these BSMs because they are broadcasted. These ego vehicles use the sensor data as an input to their ADAS systems or autonomous driving systems; these ADAS systems or autonomous driving systems then rely on the accuracy of the sensor data and control the operation of the ego vehicle based on the information included in the sensor data. However, there is no guarantee that the sensor data is accurate. It is also possible that the sensor data has been alternated by a malicious party such as a hacker. This is problematic because the ADAS systems and the autonomous driving system of the ego vehicle are safety critical components and their proper operation relies on the accuracy of the sensor data received from other vehicles.

The modification system described herein is operable, when executed by a processor of a connected vehicle, to cause the processor to execute one or more of the following steps: identify instances where sensor data is inaccurate; identify vehicles that are misbehaving by transmitting inaccurate (or fake) sensor data; and take steps to ensure the proper operation of the ADAS systems and autonomous driving systems of the ego vehicle.

The existing solutions to this problem are inadequate because: (1) they do not identify a misbehaving endpoint that is repeatedly transmitting inaccurate sensor data via V2X communications; and (2) they do not take steps to modify the operation of an ego vehicle's ADAS systems or autonomous driving system so that the inaccurate sensor data transmitted by a misbehaving endpoint is ignored in the future by the ego vehicle so that the inaccurate sensor data does not create a safety hazard. Moreover, the existing solutions appear to be unconcerned with identifying misbehaving endpoints that repeatedly transmit inaccurate sensor data or taking steps to reduce any safety hazards that would be created by ego vehicles operating their ADAS systems or autonomous driving systems using this inaccurate sensor data as an input.

In some embodiments, the modification system includes code and routines that are installed on an Electronic Control Unit (ECU) of an ego vehicle. The ego vehicle is a connected vehicle. In some embodiments, the ego vehicle is an autonomous or semi-autonomous vehicle. The ego vehicle includes a V2X radio that is operable to receive V2X messages such as DSRC communications.

The ego vehicle receives V2X messages that include safety critical information that is used by the ego vehicle to control the operation of one or more components of the ego vehicle. These V2X messages are broadcast by a remote vehicle. For example, the ego vehicle receives a BSM from a remote vehicle that includes sensor data that was recorded by the remote vehicle. The sensor data is digital information describing an environment of the ego vehicle. An ADAS system or autonomous driving system of the ego vehicle uses this sensor data as an input when controlling the operation of the ego vehicle or the components of the ego vehicle (e.g., the braking system, the steering system, calculation of message rate, etc.).

The remote vehicle transmits additional BSMs over time including new instances of sensor data; each received BSM has a Received Signal Strength (RSS) that is measurable by the modification system of the ego vehicle. The modification system includes code and routines that are operable, when executed by the ECU, to cause the ECU to generate RSS data that describes the RSS of each received BSM.

In some embodiments, the modification system of the ego vehicle includes code and routines that are operable, when executed by the ECU, to cause the ECU to analyze the RSS data of each received BSM and determines, based on the RSS described by the RSS data, an instance of range data. Range data is digital data that describes an estimated range separating the ego vehicle from objects in the environment of the ego vehicle (e.g., a range separating the ego vehicle from the remote vehicle that transmitted the BSM received by the ego vehicle).

In some embodiments, the modification system of the ego vehicle includes code and routines that are operable, when executed by the ECU, to cause the ECU to compare the range data to range information that is included in the sensor data. Based on this comparison, the modification system includes code and routines that are operable, when executed by the ECU, to cause the ECU to determine whether the remote vehicle is misbehaving by providing false information about the environment of the ego vehicle.

In some embodiments, if misbehavior is detected by the modification system of the ego vehicle, then the modification system includes code and routines that are operable, when executed by the ECU, to cause the ECU to execute one or more of the following steps: (1) generate misbehavior data that uniquely identifies the particular remote vehicle that is misbehaving [or determined to be misbehaving]; and (2) modify the operation of the ADAS systems or the autonomous driving system of the ego vehicle so that they ignore sensor data received in future BSMs transmitted by this particular remote vehicle (but not other remote vehicles).

For example, the modification system tracks instances of sensor data that are received from remote vehicles described by the misbehavior data and does not input the sensor data from this particular remote vehicle to the ADAS systems or autonomous driving system of the ego vehicle.

In another example, the BSM data included in each BSM includes a unique vehicle identifier. The modification system of the ego vehicle includes code and routines that are operable, when executed by the ECU, to cause the ECU to generate an exclusion list that describes the vehicle identifiers that are known to transmit inaccurate sensor data as determined by the modification system. The misbehavior data may be added to the exclusion list. The modification system excludes/ignores any sensor data received from a remote vehicle whose vehicle identifiers are included on the exclusion list. Other examples are possible.

In some embodiments, the modification system includes code and routines that are operable, when executed by the ECU, to cause the ECU to execute the following steps: (1) listen to channels of the V2X radio of an ego vehicle for a BSM; (2) receive a BSM that was broadcast by a remote vehicle and received by the ego vehicle; (3) parse BSM data from the received BSM; (4) extract sensor data from the BSM data; (5) generate RSS data that describes the received signal strength of the BSM received at step 2; (6) receive a plurality of subsequent BSMs from the same remote vehicle whose BSM was received at step 2; (7) repeat steps 3-5 for the subsequent instances BSMs received at step 6 [the outcome of this step 7 is: a set of sensor data for the BSMs; and a set of RSS data from the BSMs]; (8) for each BSM received at step 2 and step 6, analyze the set of RSS data to determine, based on the values of RSS described by the set of RSS data, an instance of range data [the range data is digital data that describes an estimated range separating the ego vehicle from objects in the environment of the ego vehicle]; (9) compare the range data to range information that is included in the set of sensor data [based on this comparison, the modification system determines whether the remote vehicle is misbehaving by providing false information about the environment of the ego vehicle]; and (10) if the remote vehicle is misbehaving, the modification system modifies the operation of the ADAS systems, the autonomous driving systems, or the V2X communication system of the ego vehicle so that they do not receive or otherwise consider the sensor data that is provided by the remote vehicle which is determined at step 9 to be providing false information.

The functionality of the modification system is not limited to DSRC technology. For example, the method described in the preceding paragraph refers to BSMs, but the modification system is operable to provide its functionality using other types of V2X messages and the digital data payload that is included in these V2X messages.

Referring to FIG. 1A, depicted is an operating environment 100 for a modification system 199 according to some embodiments. As depicted, the operating environment 100 includes the following elements: an ego vehicle 123; a set of remote vehicles 124; and a computer 104 used by a hacker or some other malicious part. These elements are communicatively coupled to one another by a network 105.

Although one ego vehicle 123, one computer 104, and one network 105 are depicted in FIG. 1A, in practice the operating environment 100 may include one or more vehicles 123, one or more computers 104, and one or more networks 105.

The set of remote vehicles 124 includes one or more connected vehicles. The connected vehicles included in the set of remote vehicles 124 include similar functionality as the ego vehicle 123. The connected vehicles included in the set of remote vehicles 124 are referred to herein as a "remote vehicle" (if singular) or the "remote vehicles" (if plural).

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, LTE-5G or any other mobile data network or combination of mobile data networks. Further, the network 105 may include one or more IEEE 802.11 wireless networks.

The following are endpoints of the network 105: the vehicles 123; the computer 104; and the set of remote vehicles 124.

The computer 104 is any processor-based computing device that is operated by, or whose bandwidth or computational abilities are utilized by, a hacker or some other malicious party. In some embodiments, a hacker or a malicious party is a person or a computer program that intends to purposefully provide false or misleading digital data to the ego vehicle 123 via the network 105. A person or a computer program may be classified as a "hacker" or a "malicious party" regardless of whether the hacker or malicious party are successful in carrying out their purpose to provide the false or misleading digital data to the ego vehicle 123.

The ego vehicle 123 is any type of connected vehicle. For example, the ego vehicle 123 is one of the following types of vehicles: a car; a truck; a sports utility vehicle; a bus; a semi-truck; a robotic car; a drone or any other roadway-based conveyance. In some embodiments, the ego vehicle 123 is a DSRC-equipped vehicle.

In some embodiments, the ego vehicle 123 is an autonomous vehicle or a semi-autonomous vehicle. For example, the ego vehicle 123 includes a set of Advanced Driver Assistance Systems 180 (a set of "ADAS systems" 180) which provide autonomous features to the ego vehicle 123 which are sufficient to render the ego vehicle 123 an autonomous vehicle.

The National Highway Traffic Safety Administration ("NHTSA") has defined different "levels" of autonomous vehicles, e.g., Level 0, Level 1, Level 2, Level 3, Level 4 and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems 180 installed in a vehicle have no vehicle control. The set of ADAS systems 180 may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems 180 installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems 180 installed in the autonomous vehicle fail to respond properly (based on the driver's subjective judgment). The set of ADAS systems 180 installed in the autonomous vehicle executes accelerating, braking, and steering. The set of ADAS systems 180 installed in the autonomous vehicle can deactivate immediately upon takeover by the driver.

Level 3: Within known, limited environments (such as freeways), the driver can safely turn their attention away from driving tasks but must still be prepared to take control of the autonomous vehicle when needed.

Level 4: The set of ADAS systems 180 installed in the autonomous vehicle can control the autonomous vehicle in all but a few environments such as severe weather. The driver must enable the automated system (which is comprised of the set of ADAS systems 180 installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the ego vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

Examples of the ADAS systems included in the set of ADAS systems 180 may include one or more of the following elements of the vehicle 123: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The autonomous driving system 181 is any computer system whose operation renders the ego vehicle 123 an autonomous vehicle. For example, the autonomous driving system 181 includes an onboard unit having a set of ADAS systems 180 installed therein and the onboard unit executes the set of ADAS systems 180 to ender the ego vehicle 123 an autonomous vehicle. The autonomous driving system 181 is an optional element of the ego vehicle 123. The ego vehicle 123 does not have to be autonomous for the modification system 199 to provide its functionality.

In some embodiments, the ego vehicle 123 includes the following elements: the set of ADAS systems 180; the autonomous driving system 181; a processor 125; a memory 127; a communication unit 145; an electronic control unit 194 (ECU 194); and a modification system 199.

In some embodiments, the processor 125 and the memory 127 may be elements of an onboard vehicle computer system (such as computer system 200 described below with reference to FIG. 2). The onboard vehicle computer system may be operable to cause or control the operation of the modification system 199 of the ego vehicle 123. The onboard vehicle computer system may be operable to access and execute the data stored on the memory 127 to provide the functionality described herein for the modification system 199 of the ego vehicle 123 or its elements (see, e.g., FIG. 2). The onboard vehicle computer system may be operable to execute the modification system 199 which causes the onboard vehicle computer system to execute one or more steps of one or more of the method 300 described below with reference to FIG. 3 and/or the method 800 described below with reference to FIG. 8.

In some embodiments, the processor 125 and the memory 127 may be elements of an onboard unit. The onboard unit includes the ECU 194 or some other onboard vehicle computer system that may be operable to cause or control the operation of the modification system 199. The onboard unit may be operable to access and execute the data stored on the memory 127 to provide the functionality described herein for the modification system 199 or its elements. The onboard unit may be operable to execute the modification system 199 which causes the onboard unit to execute one or more steps of one or more of the method 300 described below with reference to FIG. 3 and/or the method 800 described below with reference to FIG. 8. In some embodiments, the computer system 200 depicted in FIG. 2 is an example of an onboard unit. For example, the computer system 200 is an example of an ECU 194.

In some embodiments, the ego vehicle 123 may include a sensor set. The sensor set may include one or more sensors that are operable to measure the physical environment outside of the ego vehicle 123. For example, the sensor set may include one or more sensors that record one or more physical characteristics of the physical environment that is proximate to the ego vehicle 123. The memory 127 may store sensor data that describes the one or more physical characteristics recorded by the sensor set.

In some embodiments, the sensor set of the ego vehicle 123 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The ego vehicle 123 may include one or more memories 127.

In some embodiments, the memory 127 stores, as digital data, any data described herein. In some embodiments, the memory 127 stores any data that is necessary for the modification system 199 to provide its functionality.

For example, the memory 127 stores the following types of digital data: BSM data 195; sensor data 185; RSS data 186; range data 187; misbehavior data 188; and an exclusion list 189.

The BSM data 195 includes the digital data that is the payload for a V2X message. Examples of the BSM data 195 are depicted in FIGS. 4 and 5.

The sensor data 185 includes digital data that describes the sensor measurements that are measured and recorded by the sensor set.

In some embodiments, the sensor data 185 is digital data that is included in the BSM data 195 that is received from a remote vehicle included in the set of remote vehicles 124. In these embodiments, the sensor data 185 includes digital data that describes sensor measurements that are measured and recorded by the sensor set of a remote vehicle included in the set of remote vehicles 124.

The RSS data 186 includes digital data that describes the RSS (e.g., an RSS value) of each BSM (or some other V2X message) received by the communication unit 145 of the ego vehicle 123.

The range data 187 includes digital data that describes an estimated range separating the vehicle from objects in the environment of the ego vehicle 123 (e.g., a range separating the ego vehicle 123 from the remote vehicle that transmitted the BSM received by the ego vehicle 123).

The misbehavior data 188 includes digital data that that uniquely identifies a particular remote vehicle [e.g., from the set of remote vehicles 124] that is misbehaving or determined by the modification system 199 to be misbehaving. For example, a misbehaving vehicle is one that is including inaccurate sensor data in the BSM data that serves as a payload for a BSM (or some other V2X message) transmitted by the remote vehicle. In some embodiments, a misbehaving vehicle is a virtualized vehicle that does not exists in the real-world but whose presence is simulated by a hacker using the computer 104.

If misbehavior is detected by the modification system 199, then the modification system: (1) generates misbehavior data 188 that uniquely identifies the particular remote vehicle whose is misbehaving; and (2) modifies the operation of the ADAS systems 180 or the autonomous driving system 181 of the ego vehicle 123 so that these systems ignore sensor data 185 received in future BSMs transmitted by the particular remote vehicle that is determined by the modification system 199 to be a misbehaving vehicle (but not other remote vehicles).

For example, the modification system tracks instances of sensor data 185 that are received from remote vehicles described by the misbehavior data 188 and does not input the sensor data 185 received from misbehaving vehicles to the ADAS systems 180 or autonomous driving system 181 of the ego vehicle 123.

The exclusion list 189 includes digital data that describes the vehicle identifiers for remote vehicles that are known to transmit inaccurate sensor data 185 as determined by the modification system 199.

For example, the BSM data 195 included in each BSM includes a unique vehicle identifier. The modification system 199 generates an exclusion list 189 that describes the vehicle identifiers that are known to transmit inaccurate sensor data 185 as determined by the modification system 199. The misbehavior data 188 for these misbehaving vehicles may be added to the exclusion list 189 by the modification system 199. The modification system 199 excludes/ignores any sensor data 185 received from a remote vehicle whose vehicle identifiers are included on the exclusion list 189. Other examples are possible.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes: a first V2X radio 147; and a second V2X radio 148.

The first V2X radio 147 is an electronic device that includes a V2X transmitter and a V2X receiver that is operable to send and receive wireless messages via any V2X protocol. For example, the first V2X radio 147 is operable to send and receive wireless messages via DSRC. The V2X transmitter is operable to transmit and broadcast DSRC messages over the 5.9 GHz band. The V2X receiver is operable to receive DSRC messages over the 5.9 GHz band. The first V2X radio 147 includes seven channels (e.g., DSRC channel numbers 172, 174, 176, 178, 180, 182 and 184) with at least one of these channels reserved for sending and receiving BSMs (e.g., DSRC channel number 172 is reserved for BSMs). In some embodiments, at least one of these channels is reserved for sending and receiving Pedestrian Safety Messages (PSMs) as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs. In some embodiments, DSRC channel number 176 is reserved for sending and receiving PSMs.

In some embodiments, the first V2X radio 147 includes a non-transitory memory which stores digital data that controls the frequency for broadcasting BSMs. In some embodiments, the non-transitory memory stores a buffered version of the GPS data for the ego vehicle 123 so that the GPS data for the ego vehicle 123 is broadcast as an element of the BSMs which are regularly broadcast by the first V2X radio 147.

In some embodiments, the first V2X radio 147 includes any hardware or software which is necessary to make the ego vehicle 123 compliant with the DSRC standards. In some embodiments, the DSRC-compliant GPS unit 250 depicted in FIG. 2 is an element of the first V2X radio 147.

The second V2X radio 148 is an electronic device that includes a V2X transmitter and a V2X receiver that is operable to send and receive wireless messages via any V2X protocol. The second V2X radio 148 provides functionality that is similar to the first V2X radio 147, and so, that description will not be repeated here.

Figure 1B:
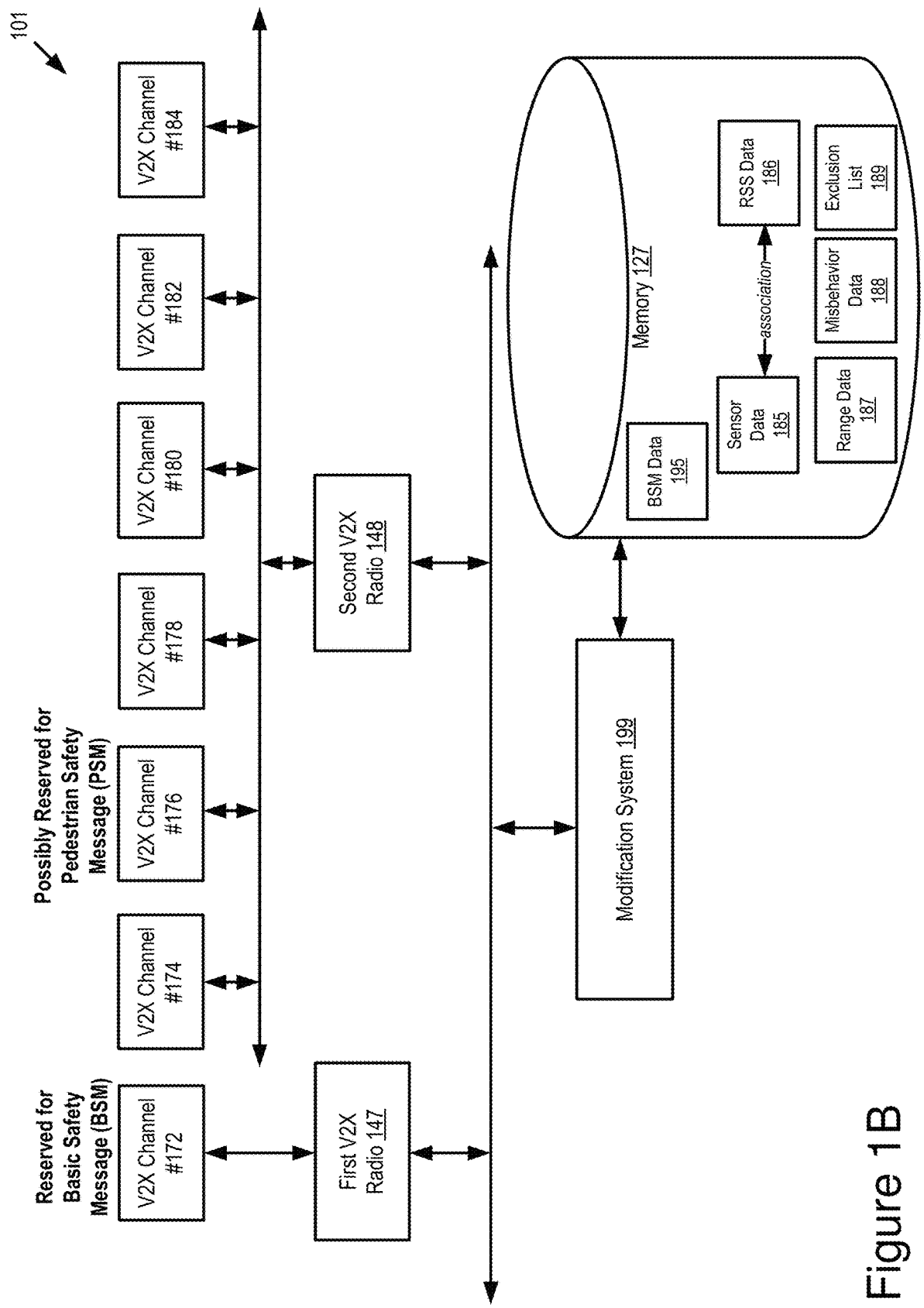
FIG. 1B is a block diagram illustrating a set of V2X radios and a modification system according to some embodiments.

In some embodiments, the first V2X radio 147 includes a single channel that is dedicated to sending and/or receiving a particular type of wireless message. For example, the first V2X radio 147 includes a single channel that is dedicated to sending and receiving BSMs. See, for example, FIG. 1B in which the first V2X radio 147 includes channel 172 which is dedicated to sending and receiving BSMs. In some embodiments, the first V2X radio 147 includes a single channel that is dedicated to sending and receiving BSMs and the second V2X radio 148 includes a plurality of other channels that are operable to send and receive any V2X messages that are not BSMs. For example, the second V2X radio 148 includes six other channels as depicted in FIG. 1B that are operable to send and receive any V2X messages that are not BSMs.

In another example, the first V2X radio 147 includes a single channel that is dedicated to receiving PSMs and the second V2X radio 148 includes a plurality of other channels that are operable to send and receive any V2X messages that are not PSMs.

In some embodiments, the first V2X radio 147 is a first DSRC radio dedicated to sending and receiving BSMs. The first V2X radio 147 includes a first DSRC radio transceiver. The second V2X radio 148 is a second DSRC radio that sends and receives any DSRC messages which are not BSMs. The second V2X radio 148 includes a second DSRC radio transceiver. Accordingly, in some embodiments the ego vehicle 123 is a DSRC-enabled vehicle that includes two different DSRC radios.

In some embodiments, the modification system 199 includes software that is operable, when executed by the processor 125, to cause the processor 125 to execute one or more steps of the method 300 described below with reference to FIG. 3 and/or the method 800 described below with reference to FIG. 8. The functionality of the modification system 199 is described in more detail below according to some embodiments.

In some embodiments, the modification system 199 is implemented using hardware including a field-programmable gate array ("FPGA") or an application-specific integrated circuit ("ASIC"). In some other embodiments, the modification system 199 implemented using a combination of hardware and software.

A remote vehicle includes elements similar to the ego vehicle 123. For example, a remote vehicle includes one or more of the following elements: a processor 125; an ECU 194; a modification system 199; a communication unit 145; a set of ADAS systems 180; an autonomous driving system 181; and a memory 127 storing digital data similar to that which is stored by the memory 127 of the ego vehicle 123. In some embodiments, the remote vehicle is a manufactured by a same manufacturer as the ego vehicle 123 and these vehicles are configured or otherwise operable to cooperate with one another to provide the functionality of the modification system 199.

The remote vehicle is an electronic device that is operable to send and receive V2X communications. For example, the remote vehicle is an DSRC-equipped device that is operable to send and receive DSRC messages, BSMs, or some other type of V2X messages including the BSM data 195 as its payload.

In some embodiments, the computer 104 is any electronic device that is operable to send and receive V2X communications. For example, computer 104 is an electronic device, or another connected vehicle, including a communication unit similar to the communication unit 145. In some embodiments, the computer 104 is a smartphone, tablet computer, personal computer, roadside unit or some other processor-based computing device that includes a communication unit 145. In some embodiments, computer 104 is a DSRC-equipped device that is operable to send and receive DSRC messages, BSMs, or some other type of V2X messages including the BSM data 195 as its payload.

DSRC is increasingly being included in vehicles because it is a source of sensor data 185 which is required for many ADAS systems (such as those included in the set of ADAS systems 180) or autonomous driving systems 181 to provide their functionality. In the United States, seven different channels are dedicated to DSRC, with one of these seven channels generally used for transmission of BSMs. For example, the channel is used about 99% of the time for BSM transmissions, and so, for the purposes of this description, this channel is referred to as "the channel dedicated to BSMs" or "the channel reserved for BSMs." The channel dedicated to BSMs (i.e., channel 172) receives a lot of use because each DSRC-enabled vehicle on the roadway transmits BSMs at regular intervals (e.g., one every 0.10 seconds). Another of these seven channels may be generally used for PSMs in a manner similar to how channel 172 is generally used for BSMs, and so, this channel is referred to as being "dedicated to PSMs" or "reserved for PSMs." For example, it is thought that channel 176 may be generally used for PSMs.

In some embodiments, when the ego vehicle 123 is operating on a roadway these two channels (i.e., the first for BSMs and the second for PSMs) are in near constant use, almost always sending or receiving BSMs or PSMs. As a result, the remaining five channels dedicated to DSRC messages will be difficult to use due to adjacent channel interference caused by the large number of BSMs and PSMs. In some embodiments, the modification system 199 solves this problem by eliminating adjacent channel interference such that DSRC messages can be received on one channel while one or more DSRC messages are being transmitted on neighboring channels.

In some embodiments, the ego vehicle 123 is equipped with two or more different DSRC radios (e.g., the first V2X radio 147 and the second V2X radio 148). Each of the DSRC radios includes a DSRC transmitter and a DSRC receiver. One of the DSRC radios is dedicated solely to receiving BSMs. The other DSRC radio(s) is used to receive any other non-BSM DSRC messages.

In some embodiments, the memory 127 stores mask data. The mask data includes digital data that describes the transmission mask for each of the seven DSRC channels.

In some embodiments, the modification system 199 includes code and routines that are operable, when executed by the processor 125, to cause the processor 125 to monitor each of the seven DSRC channels. The processor 125 has access to the mask data which is stored in the memory 127. For example, the mask data is stored in a buffer of one or more of the first V2X radio 147 and the second V2X radio 148 so that it is quickly retrievable by the processor 125.

In some embodiments, the modification system 199 includes code and routines that are operable, when executed by the processor 125, to cause the processor 125 to continuously analyze each of the DSRC channels when a DSRC packet is sent (e.g., every 0.10 seconds).

Figure 8:
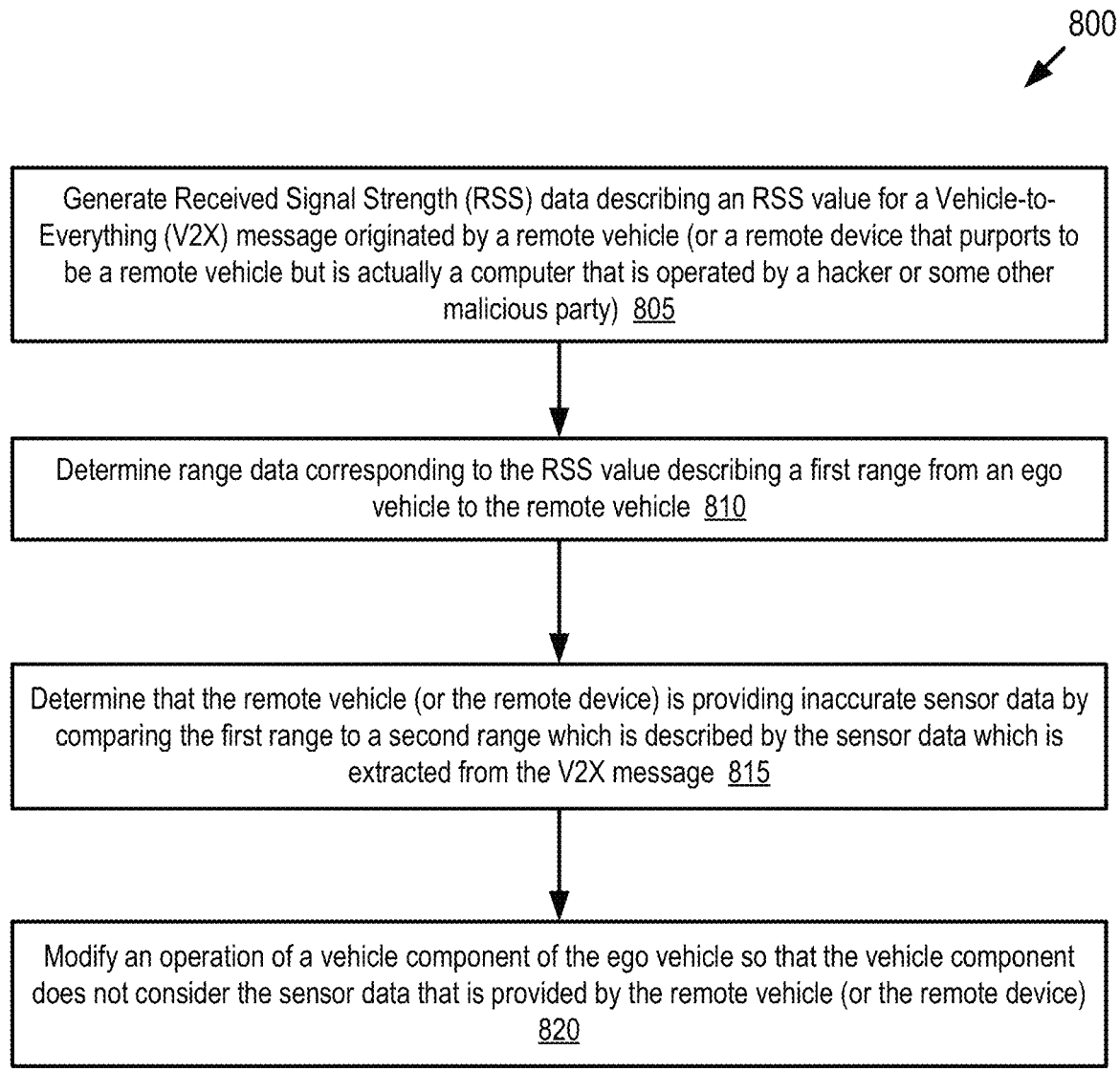
FIG. 8 depicts a method for to modifying a vehicle component based on ranging and misbehavior information determined from digital data included in a V2X communication according to some embodiments.

In some embodiments, the modification system 199 includes code and routines that are operable, when executed by the processor 125, to cause the processor 125 to execute one or more of the steps of the method 800 depicted in FIG. 8 (or one or more steps of the method 300 depicted in FIG. 3) responsive to receipt of a V2X message on one or more of the seven DSRC channels.

A transmission event is a V2X transmission (e.g., a DSRC transmission) on a particular channel of a V2X radio (e.g., a DSRC channel of a DSRC radio or some other V2X channel of a V2X radio).

In some embodiments, the modification system 199 includes software that is operable, when executed by the processor 125, to cause the processor 125 to monitor each of the DSRC channels available to the first V2X radio 147 and the second V2X radio 148. This software has access to the mask data 190 which is stored in the memory 127.

In some embodiments, the modification system 199 includes software that is operable, when executed by the processor 125, to cause the processor 125 to continuously analyze each of the DSRC channels at transmission events. For each transmission event and each DSRC channel, the modification system 199 includes software that is operable, when executed by the processor 125, to cause the processor 125 to execute one or more of the steps of the method 800 depicted in FIG. 8 (or one or more steps of the method 300 depicted in FIG. 3) responsive to receipt of a V2X message on one or more of the seven DSRC channels.

In some embodiments, the BSM data 195 includes a payload for a V2X message. For example, the BSM data 195 includes a payload for the V2X message. In some embodiments, the V2X message is a BSM. In some embodiments, the BSM data 195 describes the payload for a DSRC message or any other type of V2X message. In some embodiments, the BSM data 195 includes the sensor data 185. In some embodiments, the BSM data includes the RSS data 186.

Referring now to FIG. 1B, depicted is an is an operating environment 101 that includes a set of V2X radios 147, 148 and the modification system 199 according to some embodiments.

As depicted in FIG. 1B, V2X channel #172 is the channel is reserved for BSMs. The first V2X radio 147 is dedicated to sending and receiving BSMs using V2X channel #172. The other six V2X channels (#174, #176, #178, #180, #182 and #184) are accessible to the second V2X radio 148. As depicted in this embodiment, channel #176 is reserved for receiving PSMs.

In some embodiments, the sensor data 185 is associated with the RSS data 186 because the RSS data 186 describes the signal strength of a particular BSM that included the sensor data 185 within the BSM data 195 that was the payload for that particular BSM.

Example Computer System

Figure 2:
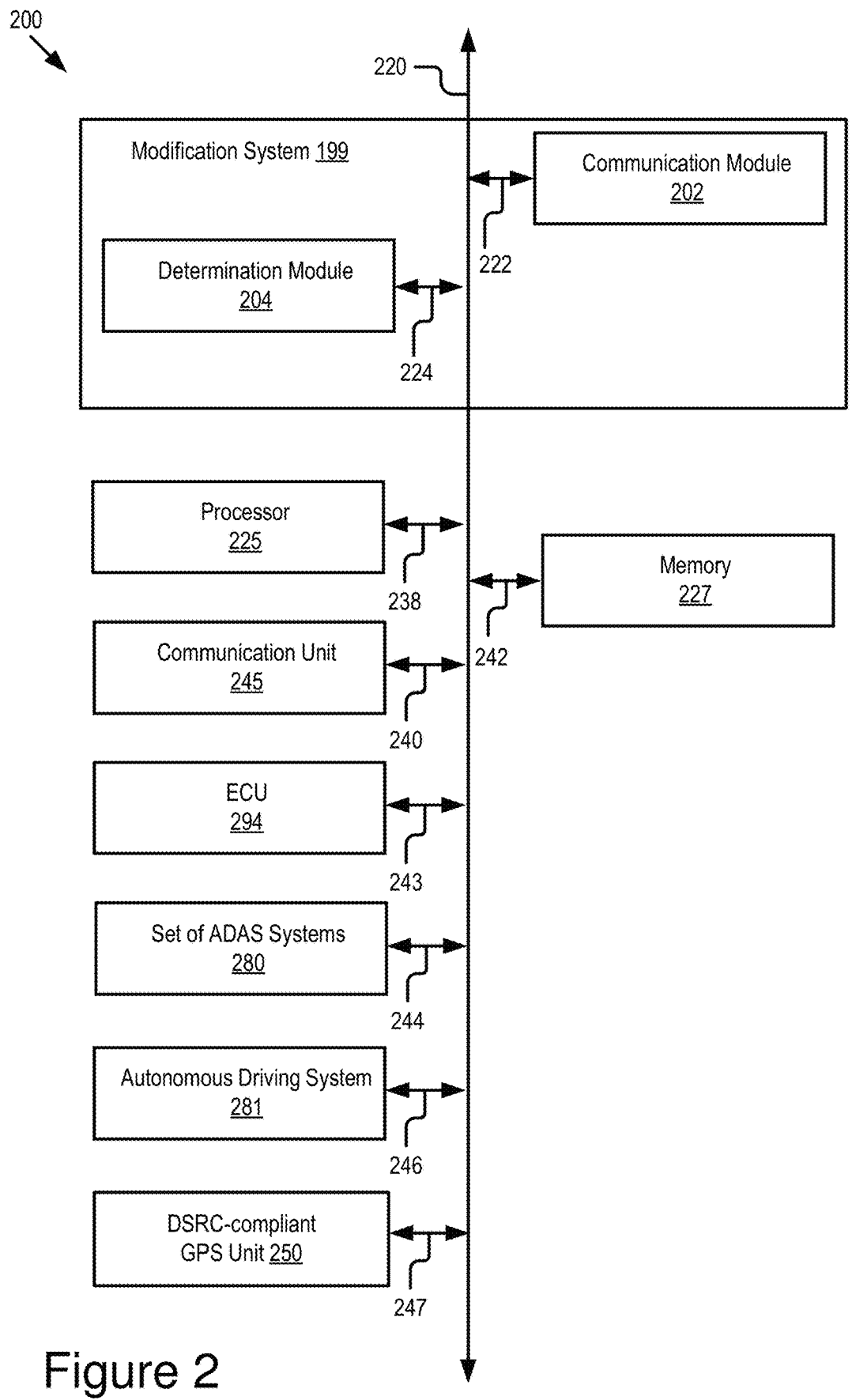
FIG. 2 is a block diagram illustrating an example computer system including the modification system according to some embodiments.

Referring now to FIG. 2, depicted is a block diagram illustrating an example computer system 200 including the modification system 199 according to some embodiments. In some embodiments, the computer system 200 may include a special-purpose computer system that is programmed to perform one or more steps of one or more of the method 300 described below with reference to FIG. 3 (one or more steps of one or more of the method 800 described below with reference to FIG. 8). In some embodiments, the computer system 200 is an onboard vehicle computer of the ego vehicle 123. In some embodiments, the computer system 200 is an onboard unit of the ego vehicle 123. In some embodiments, the computer system 200 is an ECU, head unit or some other processor-based computing device of the ego vehicle 123.

The computer system 200 includes one or more of the following elements according to some examples: the modification system 199; a processor 225; a communication unit 245; a memory 227; an ECU 294; a set of ADAS systems 280; an autonomous driving system 281; and a DSRC-compliant GPS unit 250. The components of the computer system 200 are communicatively coupled by a bus 220.

In the illustrated embodiment, the processor 225 is communicatively coupled to the bus 220 via a signal line 238. The communication unit 245 is communicatively coupled to the bus 220 via a signal line 240. The memory 127 is communicatively coupled to the bus 220 via a signal line 242. The ECU 294 is communicatively coupled to the bus 220 via a signal line 243. The set of ADAS systems 280 is communicatively coupled to the bus 220 via a signal line 244. The autonomous driving system 281 is communicatively coupled to the bus 220 via a signal line 246. The DSRC-compliant GPS unit 250 is communicatively coupled to the bus 220 via a signal line 244.

The processor 225 provides similar functionality as the processor 125 described above with reference to FIG. 1A, and so, that description will not be repeated here. The communication unit 245 provides similar functionality as the communication unit 245 described above with reference to FIG. 1A, and so, that description will not be repeated here. The memory 227 provides similar functionality as the memory 127 described above with reference to FIG. 1A, and so, that description will not be repeated here. The ECU 294 provides similar functionality as the ECU 194 described above with reference to FIG. 1A, and so, that description will not be repeated here. The set of ADAS systems 280 provides similar functionality as the set of ADAS systems 180 described above with reference to FIG. 1A, and so, that description will not be repeated here. The autonomous driving system 281 provides similar functionality as the autonomous driving system 181 described above with reference to FIG. 1A, and so, that description will not be repeated here.

The memory 227 may store any of the data described above with reference to FIGS. 1A and 1B or below with reference to FIGS. 2-8. The memory 227 may store any digital data needed for the computer system 200 to provide its functionality.

In some embodiments, the DSRC-compliant GPS unit 250 includes any hardware and software necessary to make the ego vehicle 123, computer system 200, or the DSRC-compliant GPS unit 250 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 250 is operable to provide GPS data describing the location of the ego vehicle 123 with lane-level accuracy. For example, the ego vehicle 123 is traveling in a lane of a roadway. Lane-level accuracy means that the location of the ego vehicle 123 is described by the GPS data so accurately that the lane of travel of the ego vehicle 123 within the roadway may be accurately determined based on the GPS data for this ego vehicle 123 as provided by the DSRC-compliant GPS unit 250. In some embodiments, the GPS data is an element of the BSM data 195 (see, e.g., FIGS. 4 and 5).

In some embodiments, the DSRC-compliant GPS unit 250 includes hardware that wirelessly communicates with a GPS satellite to retrieve GPS data that describes the geographic location of the ego vehicle 123 with a precision that is compliant with the DSRC standard. The DSRC standard requires that GPS data be precise enough to infer if two vehicles (one of which is, for example, the ego vehicle 123) are located in adjacent lanes of travel. In some embodiments, the DSRC-compliant GPS unit 250 is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the modification system 199 described herein may analyze the GPS data provided by the DSRC-compliant GPS unit 250 and determine what lane the ego vehicle 123 is traveling in based on the relative positions of two or more different vehicles (one of which is, for example, the ego vehicle 123) traveling on the roadway at the same time.

By comparison to the DSRC-compliant GPS unit 250, a conventional GPS unit which is not compliant with the DSRC standard is unable to determine the location of an ego vehicle 123 with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to identify a lane of travel for an ego vehicle 123 based on GPS data alone; instead, systems having only conventional GPS units must utilize sensors such as cameras to identify the lane of travel of the ego vehicle 123. Identifying a lane of travel of a vehicle is beneficial, for example, because in some embodiments it may enable the modification system 199 to more accurately identify a location of an ego vehicle 123 including the computer system 200 and traveling in a roadway having multiple lanes of travel.

In the illustrated embodiment shown in FIG. 2, the modification system 199 includes: a communication module 202; and a determination module 204.

The communication module 202 can be software including routines for handling communications between the modification system 199 and other components of the operating environments 100 and 101 of FIGS. 1A and 1B, respectively.

In some embodiments, the communication module 202 can be a set of instructions executable by the processor 225 to provide the functionality described below for handling communications between the modification system 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100. For example, the communication module 202 receives or transmits, via the communication unit 245, some or all of the digital data stored on the memory 127. The communication module 202 may send or receive any of the digital data or messages described above with reference to FIGS. 1A and 1B or below with reference to FIGS. 2-8, via the communication unit 245.

In some embodiments, the communication module 202 receives data from components of the modification system 199 and stores the data in the memory 227 (or a buffer or cache of the memory 227, or a standalone buffer or cache which is not depicted in FIG. 2). For example, the communication module 202 receives the BSM data 195 from the communication unit 245 and stores the BSM data 195 in the memory 227.

In some embodiments, the communication module 202 may handle communications between components of the modification system 199. For example, the communication module 202 transmits the BSM data 195 from the memory 227 to the determination module 204.

In some embodiments, the determination module 204 can be a set of instructions executable by the processor 225 which are operable, when executed by the processor 225, to cause the processor 225 to execute one or more steps of the method 300 described below with reference to FIG. 3 (or one or more steps of the method 800 described below with reference to FIG. 8). In some embodiments, the determination module 204 can be stored in the memory 227 of the computer system 200 and can be accessible and executable by the processor 225. The determination module 204 may be adapted for cooperation and communication with the processor 225 and other components of the computer system 200 via signal line 224.

Figure 3:
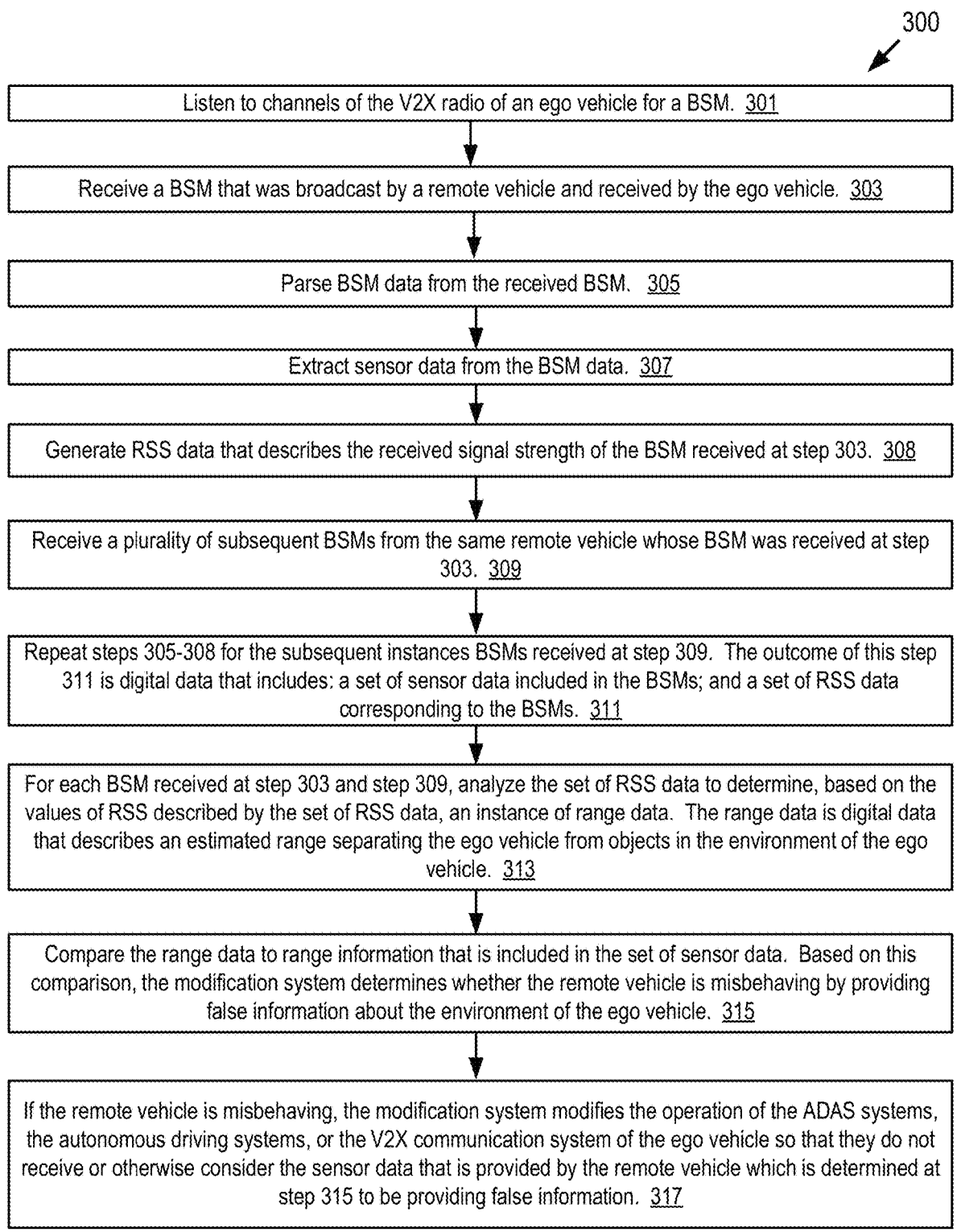
FIG. 3 depicts a method for to modifying a vehicle component based on ranging and misbehavior information determined from digital data included in a V2X communication according to some embodiments.

FIG. 3 depicts a method 300 for to modifying a vehicle component based on ranging and misbehavior information determined from digital data included in a V2X communication according to some embodiments. The steps of the method 300 are executable in any order, and not necessarily the order depicted in FIG. 3. The steps of the method 300 are now described according to some embodiments.

At step 301, listen to channels of the V2X radio of an ego vehicle for a BSM.

At step 303, receive a BSM that was broadcast by a remote vehicle and received by the ego vehicle.

At step 305, parse BSM data from the received BSM.

At step 307, extract sensor data from the BSM data.

At step 308, generate RSS data that describes the received signal strength of the BSM received at step 303.

At step 309, receive a plurality of subsequent BSMs from the same remote vehicle whose BSM was received at step 303.

At step 311, repeat steps 305-308 for the subsequent instances BSMs received at step 309. The outcome of this step 311 is: a set of sensor data for the BSMs; and a set of RSS data from the BSMs.

At step 313, for each BSM received at step 303 and step 309, analyze the set of RSS data to determine, based on the values of RSS described by the set of RSS data, an instance of range data. The range data is digital data that describes an estimated range separating the ego vehicle from objects in the environment of the ego vehicle.

At step 315, compare the range data to range information that is included in the set of sensor data. Based on this comparison, the modification system determines whether the remote vehicle is misbehaving by providing false information about the environment of the ego vehicle;

At step 317, if the remote vehicle is misbehaving, the modification system modifies the operation of the ADAS systems, the autonomous driving systems, or the V2X communication system of the ego vehicle so that they do not receive or otherwise consider the sensor data that is provided by the remote vehicle which is determined at step 315 to be providing false information.

Referring now to FIG. 4, depicted is a block diagram illustrating an example of the BSM data 195 according to some embodiments. The BSM data 195 includes the sensor data 185.

The regular interval for transmitting BSMs may be user configurable. In some embodiments, a default setting for this interval may be transmitting the BSM every 0.10 seconds or substantially every 0.10 seconds.

A BSM is broadcasted over the 5.9 GHz DSRC band. DSRC range may be substantially 1,000 meters. In some embodiments, DSRC range may include a range of substantially 100 meters to substantially 1,000 meters. DSRC range is generally 300 to 500 meters depending on variables such as topography and occlusions between DSRC-equipped endpoints.

Referring now to FIG. 5, depicted is a block diagram illustrating an example of BSM data 195 according to some embodiments.

A BSM may include two parts. These two parts may include different BSM data 195 as shown in FIG. 5.

Part 1 of the BSM data 195 may describe one or more of the following: the GPS data of the vehicle; vehicle heading; vehicle speed; vehicle acceleration; vehicle steering wheel angle; and vehicle size.

Part 2 of the BSM data 195 may include a variable set of data elements drawn from a list of optional elements. Some of the BSM data 195 included in Part 2 of the BSM are selected based on event triggers, e.g., anti-locking brake system ("ABS") being activated may trigger BSM data 195 relevant to the ABS system of the vehicle.

In some embodiments, some of the elements of Part 2 are transmitted less frequently in order to conserve bandwidth.

In some embodiments, the BSM data 195 included in a BSM includes current snapshots of a vehicle (e.g., an ego vehicle or a remote vehicle).

Referring now to FIG. 6, depicted is a block diagram illustrating a first use case 600 for the modification system according to some embodiments.

Referring now to FIG. 7, depicted is a block diagram illustrating a second use case 700 for the modification system according to some embodiments.

Referring now to FIG. 8, depicted is a method 800 for to modifying a vehicle component based on ranging and misbehavior information determined from digital data included in a V2X communication according to some embodiments.

At step 805, RSS data is generated. The RSS data describes an RSS value for a V2X message that is originated by a remote vehicle (or a remote device that purports to be originated by a remote vehicle but is actually generated by a computer that is operated by a hacker or some other malicious party).

At step 810, range data is determined. The range data corresponds to the RSS value describing a first range from an ego vehicle to the remote vehicle.

At step 815, a determination is made that the remote vehicle (or the remote device) is providing inaccurate sensor data. This determination is made by comparing the first range to a second range that is described by the sensor data which is extracted from the V2X message.

At step 820, an operation of a vehicle component of the ego vehicle is modified so that the vehicle component does not consider the sensor data that is provided by the remote vehicle. In some embodiments, modifying the operation of the vehicle component includes modifying the vehicle component so that the vehicle component does not consider the sensor data at a present time. In some embodiments, modifying the operation of the vehicle component includes modifying the vehicle component so that the vehicle component does not consider future sensor data received from the remote vehicle. In some embodiments, modifying the operation of the vehicle component includes modifying the vehicle component so that the vehicle component does not consider past sensor data received from the remote vehicle.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method executed by an ego vehicle, the method comprising:
   generating Received Signal Strength (RSS) data describing an RSS value for a first Vehicle-to-Everything (V2X) message originated by a remote vehicle;
   generating the RSS data for a second V2X message originated by the remote vehicle;
   determining a first range that changes over time from the ego vehicle to the remote vehicle based on the RSS data;

extracting a set of sensor data associated with the remote vehicle from the first V2X message and the second V2X message, wherein the set of sensor data includes a second range that changes over time;

determining that the second range is inaccurate by comparing the first range over time to the second range over time;

determining that the V2X message is transmitted by a computer that is determined by the ego vehicle, based on differences in the first range and the second range over time, to be transmitting inaccurate sensor data; and modifying an operation of an Advanced Driver Assistance System (ADAS) or an autonomous driving system of the ego vehicle so that the ADAS or the autonomous driving system does not consider the inaccurate sensor data.

2. The method of claim 1, wherein not considering the set of sensor data includes ignoring sensor data received from the V2X message and sensor data received at a future time.

3. The method of claim 1, wherein the V2X message is not one of the following: a WiFi message; a 3G message; a 4G message; a 5G message; a Long-Term Evolution (LTE) message; a millimeter wave communication message; a Bluetooth message; and a satellite communication.

4. The method of claim 1, wherein the V2X message determining that the set of sensor data is inaccurate includes determining that the first range stays the same over time while the second range decreases over time.

5. The method of claim 1, wherein the ego vehicle includes a first V2X radio that includes a single channel that is dedicated to sending and receiving Basic Safety Messages (BSMs) and a second V2X radio that includes a plurality of channels that are operable to send and receive any V2X messages that are not BSMs.

6. The method of claim 1, wherein the V2X message is received by a V2X radio that includes a plurality of channels including a reserved channel that is reserved for receiving the V2X message.

7. The method of claim 6, wherein the reserved channel is reserved for a Basic Safety Message.

8. The method of claim 1, wherein modifying the operation of the ADAS or the autonomous driving system further includes preventing the ADAS or the autonomous driving system from considering future sensor data provided by the remote vehicle.

9. A system comprising:
a processor communicatively coupled to a Vehicle-to-Everything (V2X) radio and a non-transitory memory, wherein the V2X radio is operable to receive a V2X message and the non-transitory memory stores computer code that is operable, when executed by the processor, to cause the processor to:
generate Received Signal Strength (RSS) data describing an RSS value for a V2X message originated by a remote vehicle;
generate the RSS data for a second V2X message originated by the remote vehicle;
determine a first range that changes over time from an ego vehicle to the remote vehicle based on the RSS data;
extract a set of sensor data associated with the remote vehicle from the first V2X message and the second V2X message, wherein the set of sensor data includes a second range that changes over time;
determine that the second range is inaccurate by comparing the first range over time to the second range over time;
determine that the V2X message is transmitted by a computer that is determined by the ego vehicle, based on differences in the first range and the second range over time, to be transmitting inaccurate sensor data; and
modify an operation of an Advanced Driver Assistance System (ADAS) or an autonomous driving system of the ego vehicle so that the ADAS or the autonomous driving system does not consider the inaccurate sensor data.

10. The system of claim 9, wherein the V2X message is a Basic Safety Message and the set of sensor data includes a location of the remote vehicle.

11. The system of claim 9, wherein the V2X message is not one of the following: a WiFi message; a 3G message; a 4G message; a 5G message; a Long-Term Evolution (LTE) message; a millimeter wave communication message; a Bluetooth message; and a satellite communication.

12. The system of claim 9, wherein the V2X message determining that the set of sensor data is inaccurate includes determining that the first range stays the same over time while the second range decreases over time.

13. The system of claim 9, wherein the ego vehicle includes a first V2X radio that includes a single channel that is dedicated to sending and receiving Pedestrian Safety Messages (PSMs) and a second V2X radio that includes a plurality of channels that are operable to send and receive any V2X messages that are not PSMs.

14. The system of claim 12, wherein the V2X radio includes a plurality of channels including a reserved channel that is reserved for receiving the V2X message.

15. The system of claim 14, wherein the reserved channel is reserved for a Basic Safety Messages.

16. The system of claim 9, wherein modifying the operation of the ADAS or the autonomous driving system further includes preventing the ADAS or the autonomous driving system from considering future sensor data provided by the remote vehicle.

17. A computer program product comprising a non-transitory memory storing instructions that, when executed by a processor, causes the processor to perform operations comprising:
generating Received Signal Strength (RSS) data describing an RSS value for a first Vehicle-to-Everything (V2X) message originated by a remote vehicle;
generating the RSS data for a second V2X message originated by the remote vehicle;
determining a first range that changes over time from an ego vehicle to the remote vehicle based on the RSS data;
extracting a set of sensor data associated with the remote vehicle from the first V2X message and the second V2X message, wherein the set of sensor data includes a second range that changes over time;
determining that the second range is inaccurate by comparing the first range over time to the second range over time;
determining that the V2X message is transmitted by a computer that is determined by the ego vehicle, based on differences in the first range and the second range over time, to be transmitting inaccurate sensor data; and
modifying an operation of an Advanced Driver Assistance System (ADAS) or an autonomous driving system of the ego vehicle so that the ADAS or the autonomous driving system does not consider the inaccurate sensor data.

18. The computer program product of claim 17, wherein modifying the operation of the ADAS or the autonomous driving system includes modifying the ADAS or the autonomous driving system so that a vehicle component does not consider the set of sensor data at a present time.

19. The computer program product of claim 17, wherein modifying the operation of the ADAS or the autonomous driving system includes modifying the ADAS or the autonomous driving system so that a vehicle component of the ADAS or the autonomous driving system does not consider future sensor data received from the remote vehicle.

20. The computer program product of claim 17, wherein modifying the operation of the ADAS or the autonomous driving system includes modifying the ADAS or the autonomous driving system so that a vehicle component does not consider past sensor data received from the remote vehicle.

* * * * *